(12) United States Patent
Kim

(10) Patent No.: US 10,982,854 B2
(45) Date of Patent: Apr. 20, 2021

(54) COMBUSTOR AND GAS TURBINE INCLUDING THE SAME

(71) Applicant: DOOSAN HEAVY INDUSTRIES & CONSTRUCTION CO., LTD., Changwon-si (KR)

(72) Inventor: Eunyoung Kim, Seoul (KR)

(*) Notice: Subject to any disclaimer, the term of this patent is extended or adjusted under 35 U.S.C. 154(b) by 258 days.

(21) Appl. No.: 16/028,418

(22) Filed: Jul. 6, 2018

(65) Prior Publication Data

US 2019/0086087 A1 Mar. 21, 2019

(30) Foreign Application Priority Data

Sep. 18, 2017 (KR) .................. 10-2017-0119808

(51) Int. Cl.
*F23R 3/06* (2006.01)
*F23R 3/00* (2006.01)
(Continued)

(52) U.S. Cl.
CPC .................. *F23R 3/06* (2013.01); *F02C 3/04* (2013.01); *F23R 3/002* (2013.01); *F23R 3/46* (2013.01);
(Continued)

(58) Field of Classification Search
CPC ... F23M 5/04; F23R 3/002; F23R 3/60; F05D 2240/35; F05D 2240/90; F05D 2250/11
See application file for complete search history.

(56) References Cited

U.S. PATENT DOCUMENTS 5,323,600 A * 6/1994 Munshi ..................... F23R 3/60
60/772
6,216,442 B1 4/2001 Belsom et al.
(Continued)

FOREIGN PATENT DOCUMENTS

DE 11-2014-001532 T5 12/2015
JP S599431 A 1/1984
(Continued)

OTHER PUBLICATIONS

An European Search Report dated Jan. 18, 2019 in connection with European Patent Application No. 18187855.4 which corresponds to the above-referenced U.S. application.
(Continued)

*Primary Examiner* — Ehud Gartenberg
*Assistant Examiner* — Jacek Lisowski

(57) ABSTRACT

The present disclosure relates to a combustor comprising a plurality of combustion nozzles, a cooling chamber configured to surround the plurality of combustion nozzles, an inner liner configured to surround one end of the cooling chamber and to have a plurality of through-holes formed in a circumferential direction in an end region surrounding the one end, an outer liner configured to surround the inner liner and to be spaced apart from the inner liner at a predetermined interval, and a plurality of protrusions configured to be disposed so as to be spaced apart from each other in the circumferential direction on an outer circumferential surface of the inner liner in the end region, where some of the plurality of protrusions are spaced apart from the outer circumferential surface of the inner liner and overlap with a virtual line connecting the plurality of through-holes in a direction vertical to the outer circumferential surface.

20 Claims, 11 Drawing Sheets

(51) Int. Cl.
  *F02C 3/04* (2006.01)
  *F23R 3/46* (2006.01)
  *F23R 3/60* (2006.01)

(52) U.S. Cl.
  CPC ............ *F23R 3/60* (2013.01); *F05D 2220/32* (2013.01); *F05D 2240/35* (2013.01); *F23R 2900/00017* (2013.01); *F23R 2900/03043* (2013.01)

(56) References Cited

U.S. PATENT DOCUMENTS

| | | | |
|---|---|---|---|
| 8,151,535 | B1 | 4/2012 | Thompson |
| 2002/0083711 | A1* | 7/2002 | Dean ................. F23R 3/286 60/737 |
| 2009/0044540 | A1 | 2/2009 | Pangle et al. |
| 2011/0254267 | A1* | 10/2011 | Marengo ............... B29C 33/485 285/405 |
| 2011/0314829 | A1* | 12/2011 | Kuppusamy ............ F01D 9/023 60/752 |
| 2017/0028516 | A1* | 2/2017 | Klejc ..................... F23R 3/002 |

FOREIGN PATENT DOCUMENTS

| | | |
|---|---|---|
| JP | 2002-256885 A | 9/2002 |
| JP | 2012-036896 A | 2/2012 |
| JP | 2012-042201 A | 3/2012 |
| KR | 10-2012-0001650 A | 1/2012 |
| WO | 2016-156285 A1 | 10/2016 |

OTHER PUBLICATIONS

A Korean Office Action dated Dec. 6, 2018 in connection with Korean Patent Application No. 10-2017-0119808 which corresponds to the above-referenced U.S. application.

* cited by examiner

COMBUSTOR AND GAS TURBINE INCLUDING THE SAME

CROSS-REFERENCE TO RELATED APPLICATION

This application claims priority to and the benefit of Korean Patent Application No. 10-2017-0119808 on Sep. 18, 2017, the entire contents of which are incorporated herein by reference.

BACKGROUND OF THE DISCLOSURE

Field of the Disclosure

Exemplary embodiments of the present disclosure relate to a combustor and a gas turbine including the same.

Description of the Related Art

A gas turbine is a power engine in which air compressed by a compressor is mixed with fuel to combust the mixture, and the gas turbine is rotated by high-temperature gas generated by the combustion. The gas turbine is used for driving a generator, an aircraft, a ship, a train, and the like.

Generally, the gas turbine comprises a compressor, a combustor, and a turbine. The compressor sucks outside air to compress the air and thereafter supplies the compressed air to the combustor. Pressure and temperature of compressed air by the compressor increase. The combustor mixes the compressed air supplied from the compressor with fuel to combust the mixture. The combustion gas generated by the combustion is introduced into the gas turbine. A turbine blade within the gas turbine is rotated by the combustion gas, thus generating power. The generated power is used in various fields, such as driving of mechanical devices and the like.

SUMMARY OF THE DISCLOSURE

An object of the present disclosure is to provide a combustor and a gas turbine capable of efficiently cooling a combustion nozzle in a cooling chamber.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a combustor comprises: a plurality of combustion nozzles; a cooling chamber configured to surround the plurality of combustion nozzles; an inner liner configured to surround one end of the cooling chamber and to have a plurality of through-holes formed in a circumferential direction in an end region surrounding the one end; an outer liner configured to surround the inner liner and to be spaced apart from the inner liner at a predetermined interval; a plurality of protrusions configured to be disposed so as to be spaced apart from each other in the circumferential direction on an outer circumferential surface of the inner liner in the end region, some of the plurality of protrusions being spaced apart from the outer circumferential surface of the inner liner and overlapping with a virtual line connecting the plurality of through-holes in a direction vertical to the outer circumferential surface; and a plurality of accommodation portions configured to be disposed on an inner circumferential surface of the outer liner so as to respectively correspond the plurality of protrusions and to respectively accommodate the plurality of protrusions.

Each of the plurality of protrusions may comprise a support block configured to be connected to the outer circumferential surface of the inner liner, and an insertion block configured to be disposed on the support block, only a portion of a lower surface of the insertion block being in contact with the support block.

Each of the plurality of accommodation portions may surround a portion of the insertion block when viewed from the vertical direction.

Each of the plurality of accommodation portions may have a U-shaped cross-section.

The insertion block may have a rectangular-shaped cross-section.

Each of the plurality of protrusions may further comprise a reinforcing block configured to be in contact with an upper surface of the support block and a side of the insertion block and to support the insertion block.

The reinforcing block may have a triangle-shaped cross-section.

A fixing portion configured to be connected to a side of each of the plurality of protrusions and to fix each protrusion into the accommodation portion may be further comprised.

The fixing portion may have a bent shape.

A plate spring seal configured to be interposed between the cooling chamber and the inner liner and to be disposed in the circumferential direction may be further comprised.

An inner transition piece configured to be connected to one end of the inner liner, a high-pressure gas combusted in the inner liner flowing through the inner transition piece; and an outer transition piece configured to surround the inner transition piece and to be spaced apart from the inner transition piece at a predetermined interval may be further comprised.

A plurality of first cooling holes through which a jet flow penetrates may be formed in the outer transition piece, the jet flow flowing in a direction crossing the outer circumferential surface of the inner transition piece.

A plurality of second cooling holes through which a jet flow penetrates may be formed in the outer liner, the jet flow flowing in a direction crossing the outer circumferential surface of the inner liner.

In accordance with another aspect of the present disclosure, a combustor comprises: a plurality of combustion nozzles; a cooling chamber configured to surround the plurality of combustion nozzles; an inner liner configured to surround one end of the cooling chamber and to have a plurality of through-holes formed in a circumferential direction in an end region surrounding the one end; an outer liner configured to surround the inner liner and to be spaced apart from the inner liner at a predetermined interval; an inner transition piece configured to be connected to one end of the inner liner, a high-pressure gas combusted in the inner liner flowing through the inner transition pieces; an outer transition piece configured to surround the inner transition piece and to be spaced apart from the inner transition piece at a predetermined interval; a plurality of protrusions configured to be disposed so as to be apart from each other in the circumferential direction on an outer circumferential surface of the inner liner in the end region, some of the plurality of protrusions being spaced apart from the outer circumferential surface of the inner liner and overlapping with a virtual line connecting the plurality of through-holes in a direction vertical to the outer circumferential surface; a plurality of accommodation portions configured to be disposed on an inner circumferential surface of the outer liner so as to respectively correspond the plurality of protrusions and to respectively accommodate the plurality of protrusions; and a bent fixing portion configured to be connected to a side of each of the plurality of protrusions and to fix each protrusion into the accommodation portion.

In accordance with still another aspect of the present disclosure, a gas turbine comprises: a compressor configured to compress air supplied from outside; a combustor configured to mix the air compressed by the compressor with fuel so as to combust the mixture; and a turbine comprising a plurality of turbine blades rotated by the combustion gas combusted in the combustor, in which the combustor comprises a plurality of combustion nozzles, a cooling chamber configured to surround the plurality of combustion nozzles, an inner liner configured to surround one end of the cooling chamber and to have a plurality of through-holes formed in a circumferential direction in an end region surrounding the one end, an outer liner configured to surround the inner liner and to be spaced apart from the inner liner at a predetermined interval, a plurality of protrusions configured to be disposed so as to be spaced apart from each other in the circumferential direction on an outer circumferential surface of the inner liner in the end region, some of the plurality of protrusions being spaced apart from the outer circumferential surface of the inner liner and overlapping with a virtual line connecting the plurality of through-holes in a vertical direction to the outer circumferential surface, and a plurality of accommodation portions configured to disposed on an inner circumferential surface of the outer liner so as to respectively correspond the plurality of protrusions and to respectively accommodate the plurality of protrusions.

Each of the plurality of protrusions may comprise a support block configured to be connected to the outer circumferential surface of the inner liner, and an insertion block configured to be disposed on the support block, only a portion of a lower surface of the insertion block being in contact with the support block.

Each of the plurality of accommodation portions may surround a portion of the insertion block when viewed from the vertical direction.

Each of the plurality of accommodation portions may have a U-shaped cross-section.

Each of the plurality of protrusions may further comprise a reinforcing block configured to be in contact with an upper surface of the support block and a side of the insertion block and to support the insertion block.

A fixing portion having a bent shape configured to be connected to a side of each of the plurality of protrusions and to fix each protrusion into the accommodation portion may be further comprised.

The fixing portion may have a bent shape.

The plurality of combustion nozzles may comprise a center nozzle configured to be disposed inside the center of the cooling chamber, and a plurality of main nozzles configured to surround the center nozzle and to be disposed to be spaced apart from each other along a virtual annular line inside the cooling chamber.

According to the combustor and the gas turbine, it is possible to efficiently cool the combustion nozzle in the cooling chamber.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Figure 1:
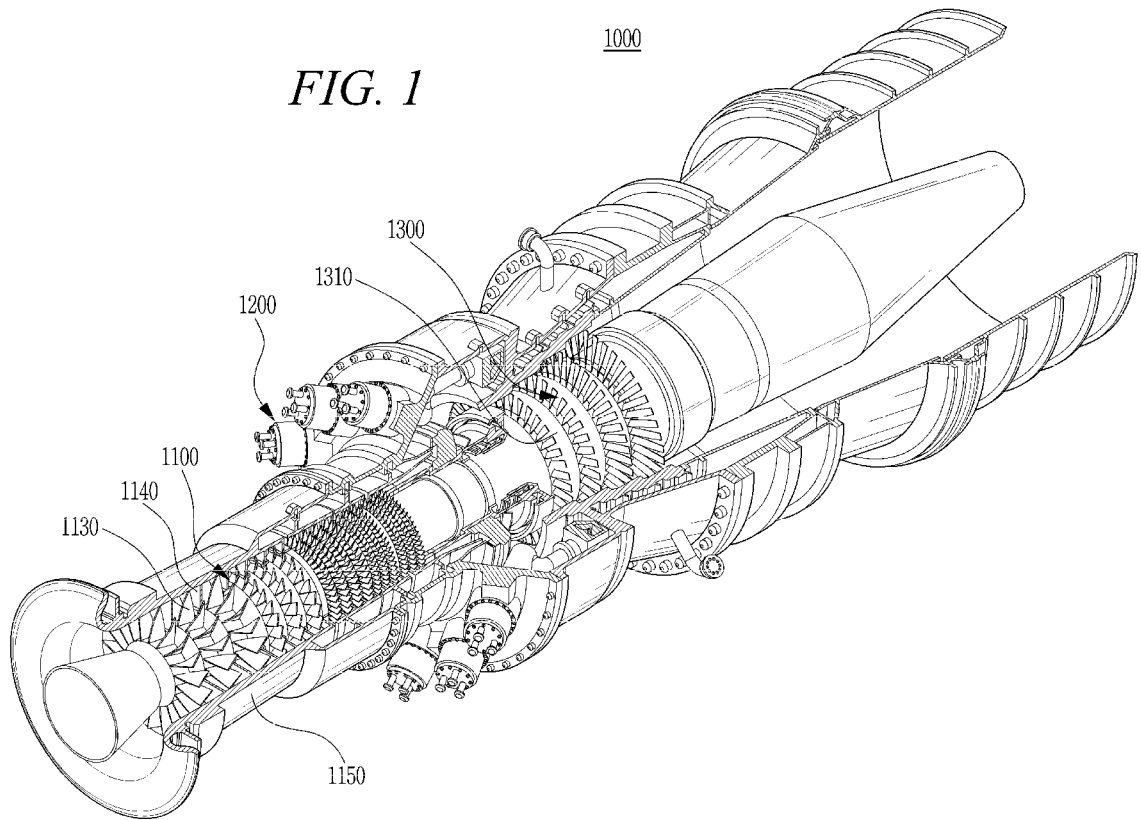
FIG. 1 is a diagram exposing an inside of a gas turbine according to a first exemplary embodiment of the present disclosure.

The present disclosure may comprise various modifications and various exemplary embodiments, and thus specific embodiments will be exemplified and described in the detailed descriptions. However, the present disclosure is not limited to specific embodiments, and may comprise all of modifications, equivalents, and substitutes within the spirit and scope of the present disclosure.

Terms used herein are used only in order to describe an exemplary embodiment rather than limiting the present disclosure. Singular forms are intended to include plural forms unless the context clearly indicates otherwise. It may be interpreted that terms "comprise", "include", "have", or the like, means the presence of features, numerals, steps, operations, components, parts, or a combination thereof mentioned in the present specification, but do not preclude the addition of one or more other features, numerals, steps, operations, components, parts, or a combination thereof.

Hereinafter, preferable exemplary embodiments of the present disclosure will be described in detail with reference to the accompanying drawings. It shall be noted that like components have like reference numerals in the accompanying drawing, as much as possible. Moreover, detailed descriptions related to well-known functions or configurations will be omitted in order not to unnecessarily obscure the gist of the present disclosure. For such reasons, in the accompanying drawings, components may be exaggerated, omitted, or schematically illustrated.

Hereinafter, a gas turbine according to an exemplary embodiment of the present disclosure will be described with reference to FIGS. 1 to 8.

Figure 2:
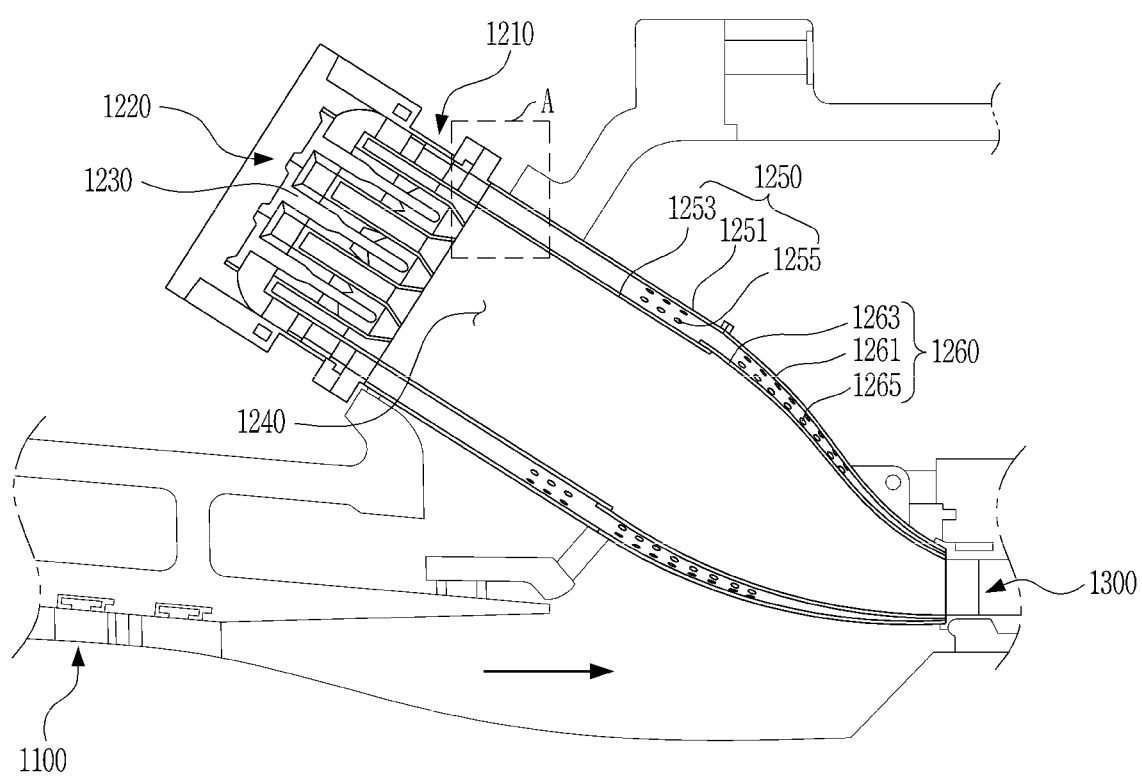
FIG. 2 is a cross-sectional view of a combustor of the gas turbine in FIG. 1.
Figure 3:
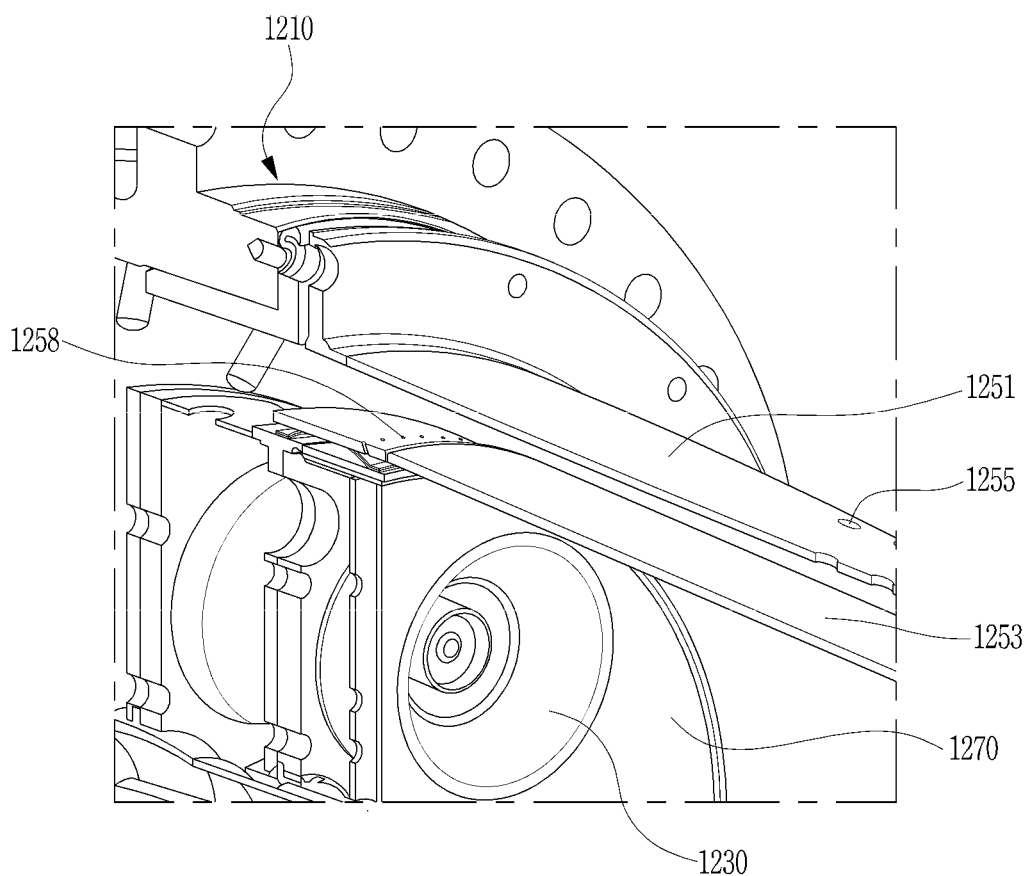
FIG. 3 is a cross-sectional view of part A in FIG. 2.
Figure 4:
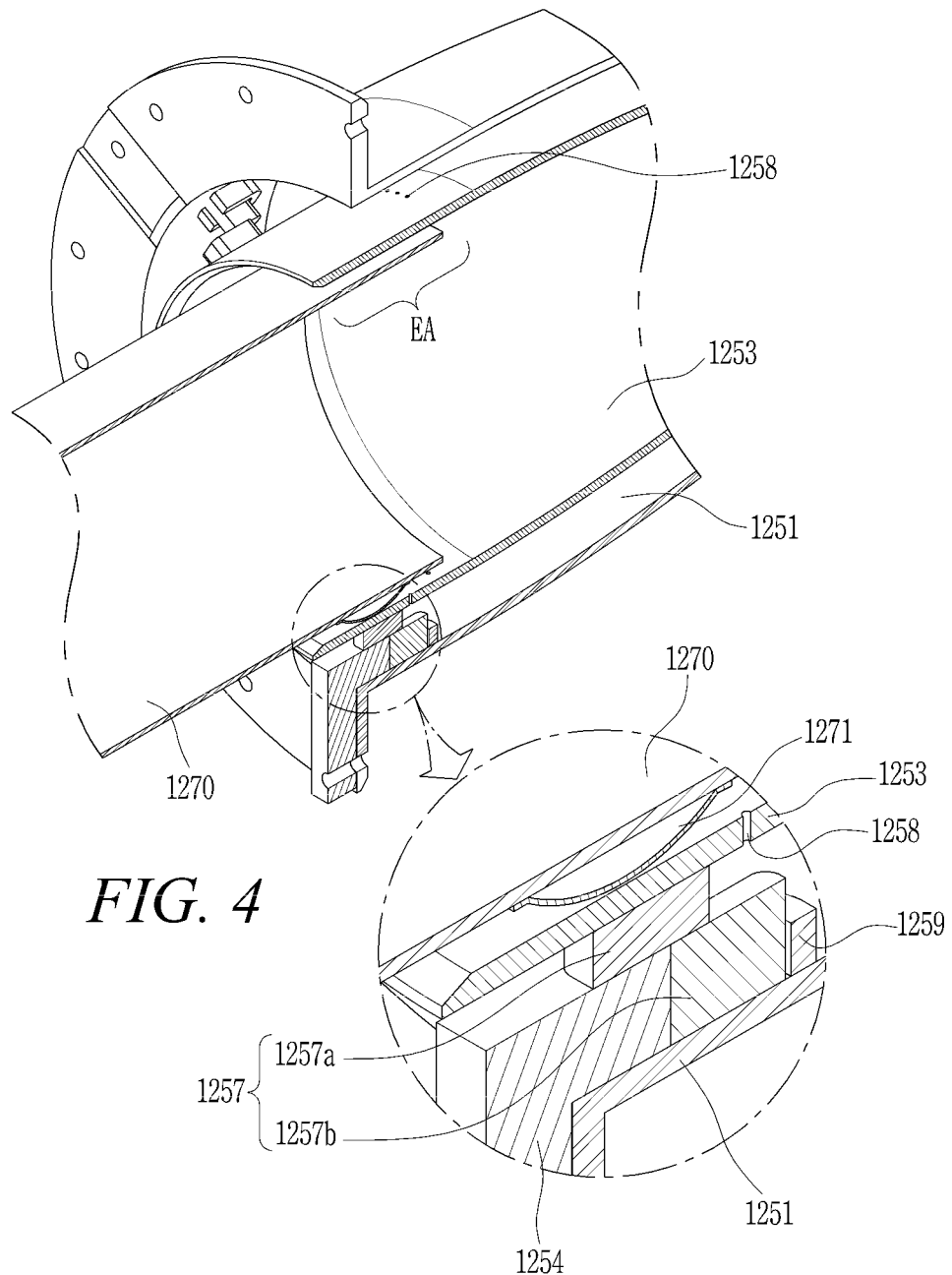
FIG. 4 is a perspective view exposing a connection state of a liner and a cooling chamber.
Figure 5:
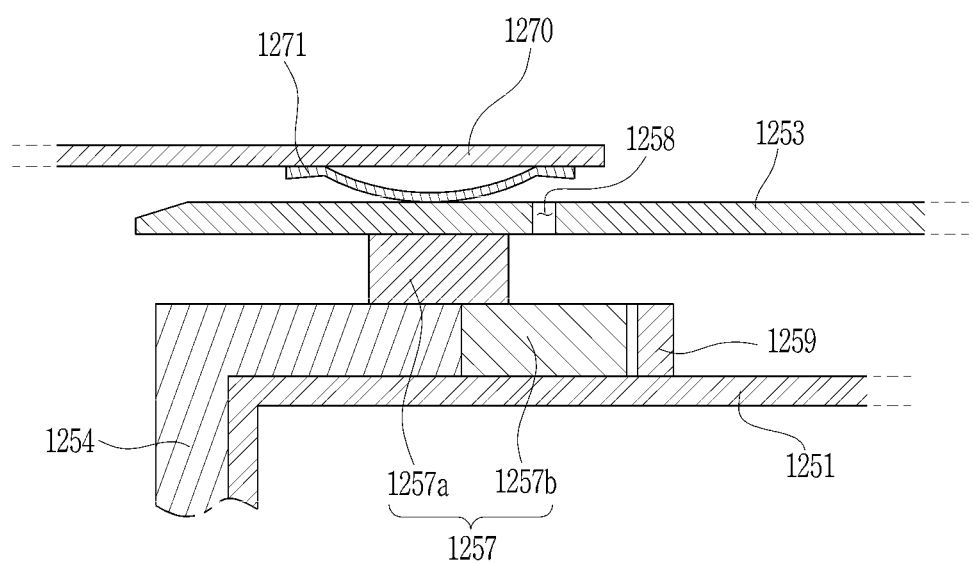
FIG. 5 is a cross-sectional view of a connection state of a protrusion, an accommodation portion, and a fixing portion in FIG. 4.
Figure 6:
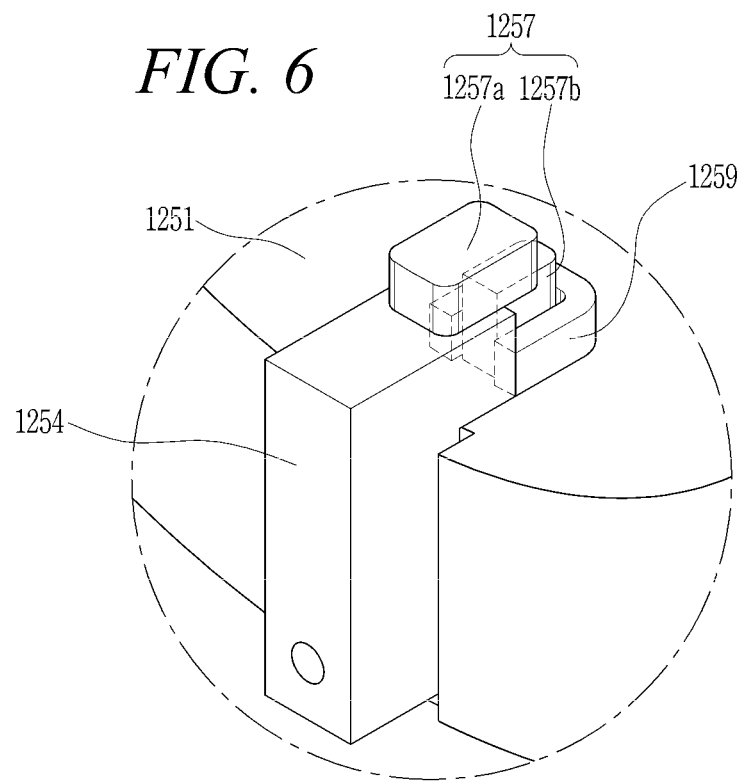
FIG. 6 is a perspective view of the connection state of the protrusion, the accommodation portion, and the fixing portion in FIG. 5.
Figure 7:
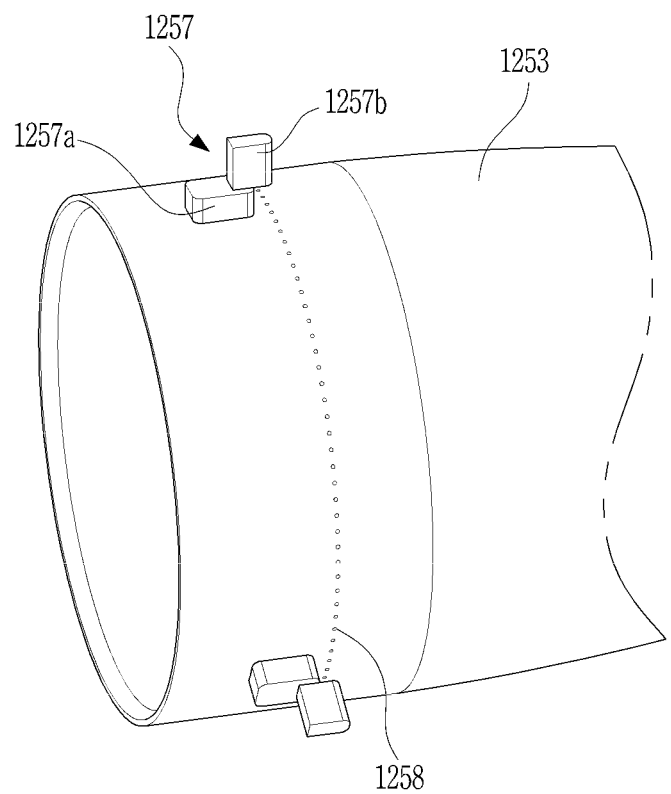
FIG. 7 is a perspective view illustrating a state where the protrusion in FIG. 5 or 6 is connected to an outer circumferential surface of an inner liner.
Figure 8:
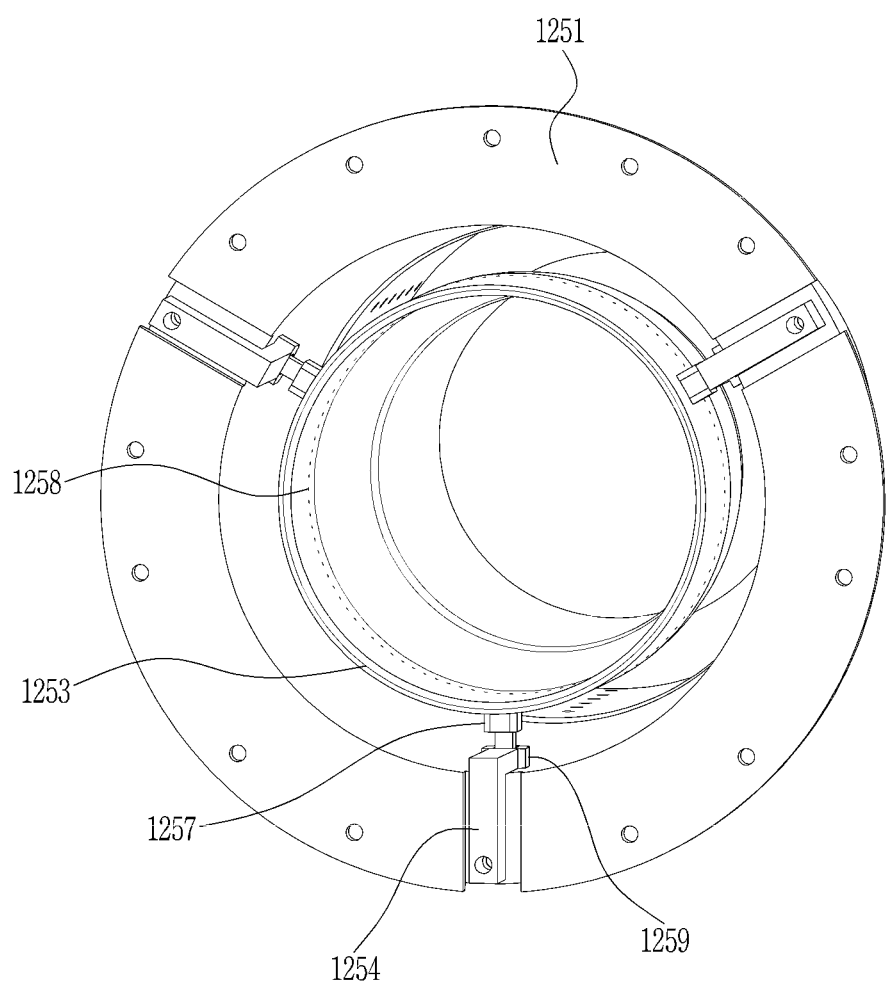
FIG. 8 is a perspective view schematically showing a connection state of the inner liner of FIG. 7 and an outer liner.
Figure 9:
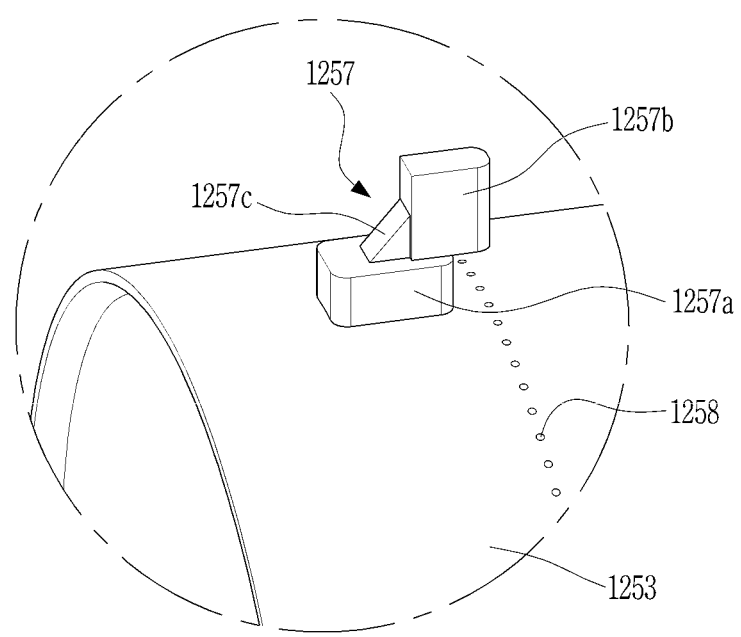
FIG. 9 is a diagram showing a modification example of a protrusion.

FIG. 1 is a diagram exposing an inside of a gas turbine according to a first exemplary embodiment of the present disclosure, and FIG. 2 is a cross-sectional view of a combustor of the gas turbine in FIG. 1. FIG. 3 is a cross-sectional view of part A in FIG. 2, and FIG. 4 is a perspective view exposing a connection state of a liner and a cooling chamber. FIG. 5 is a cross-sectional view of a connection state of a protrusion, an accommodation portion, and a fixing portion in FIG. 4, and FIG. 6 is a perspective view of the connection state of the protrusion, the accommodation portion, and the fixing portion in FIG. 5 or 6. FIG. 7 is a perspective view illustrating a state where the protrusion in FIG. 5 or 6 is connected to an outer circumferential surface of an inner liner, FIG. 8 is a perspective view schematically showing a connection state of the inner liner in FIG. 7 and an outer liner, and FIG. 9 is a diagram showing a modification example of a protrusion.

Referring to FIGS. 1 to 5, a gas turbine 1000 according to the exemplary embodiment may comprise a compressor 1100, a combustor 1200, and a turbine 1300. According to the exemplary embodiment, in the combustor 1200 that mixes the compressed air with fuel to combust the mixture, a plurality of protrusions 1257 may be disposed between an inner liner 1253 and an outer liner 1251 which are spaced apart from each other at a predetermined interval by the plurality of protrusions 1257, and the plurality of protrusions 1257 protruded from the outer circumferential surface of the inner liner 1253 may be overlapped with a plurality of through-holes 1258 formed in a circumferential direction of the inner liner 1253. According to the disposition of the plurality of protrusions 1257, the plurality of through-holes 1258 may be formed in the inner liner 1253 without interference from the plurality of protrusions 1257.

The Brayton cycle is the idealized thermodynamic cycle of the gas turbine 1000 according to the exemplary embodiment. The brayton cycle may comprise four processes configured of an isentropic compression (an adiabatic compression), an isobaric heat supply, an isentropic expansion (an adiabatic expansion), and an isobaric heat rejection. That is, the processes may be configured as follows: sucking atmospheric air to compress the air at high-pressure, combusting fuel under static pressure to discharge thermal energy, expanding the high-pressure combustion gas to convert into kinetic energy, and discharging exhaust gas with residual energy into the atmosphere. That is, the cycle is configured with four processes of compression, heating, expansion, and heat radiating. As described above, the gas turbine 1000 realizing the Brayton cycle may comprise the compressor, the combustor, and the turbine, as shown in FIG. 1. Hereinafter, it will be described with reference to FIG. 1, but the description of the present disclosure may be widely applied to a turbine engine having the same configuration as the gas turbine 1000 shown in FIG. 1.

Referring to FIG. 1, the compressor 1100 of the gas turbine 1000 may suck air from outside to compress the air. The compressor 1100 may supply the compressed air by a compressor blade 1130 to the combustor 1200 and supply cooling air to a high-temperature region requiring cooling in the gas turbine 1000. At this time, the suction air goes through the adiabatic compression process in the compressor 1100, thus the pressure and the temperature of the air through the compressor 1100 are increased.

The compressor 1100 is designed as a centrifugal compressor or an axial compressor, the centrifugal compressor is applied to a small-sized gas turbine. Meanwhile, since the large-sized gas turbine 1000 as shown in FIG. 1 is required to compress a large amount of air, a multi-stage axial compressor 1100 is generally applied to the large-sized gas turbine. In this case, in the multi-stage axial compressor 1100, the compressor blade 1130 compresses the supplied air while rotating according to rotation of a rotor disk and supplies the compressed air to a vane 1140 of the rear stage. The compressed air is gradually compressed at high-pressure through the compressor blade 1130 which is formed in multi-stage.

The vane 1140 may be mounted inside a housing 1150, and a plurality of the vanes 1140 may be mounted with stages formed thereon. The vane 1140 guides the compressed air supplied from the compressor blade 1130 of the front stage to the compressor blade 1130 of the rear stage. In the exemplary embodiment, in order to adjust the amount of air flowing into the vane and the like, at least a part of the plurality of vanes 1140 may be rotated within a predetermined range.

The compressor 1100 may be driven by some of the power output from the turbine 1300. For this, as shown in FIG. 1, a rotational axis of the compressor 1100 may be directly connected to a rotational axis of the turbine 1300. In the case of the large-sized gas turbine 1000, almost half of the entire power output generated in the turbine 1300 may be used for driving the compressor 1100. Accordingly, the improvement in the efficiency of the compressor 1100 directly affects the improvement in the entire efficiency of the gas turbine 1000.

Meanwhile, the combustor 1200 may generate a high-energy combustion gas by mixing the compressed air supplied from an outlet of the compressor 1100 with fuel and by performing isobaric combustion on the mixture. FIGS. 2 and 3 show examples where the combustor 1200 is applied to the gas turbine 1000.

Referring to FIGS. 2 and 3, the combustor 1200 according to the exemplary embodiment is disposed on a downstream side of the compressor 1100 and may comprise a plurality of burners 1220, a plurality of liners 1250, and a plurality of transition pieces 1260. In this case, a liner 1250 and a transition piece 1260 which are connected to each other in a line may configure a combustor chamber in the combustor 1200. On the other hand, a connection of a burner 1220 and the combustor chamber may configure a combustion can in the combustor 1200. That is, the combustor 1200 may be configured of a plurality of combustion cans.

The plurality of burners 1220 may be disposed along a nozzle casing 1210 formed in a circular shape. Specifically, each of the plurality of burners 1220 may be disposed on each of a plurality of nozzle casings 1210 which is disposed along a circular-shaped virtual line to be spaced apart from each other.

In this case, each burner 1220 may comprise a plurality of combustion nozzles 1230 and a cooling chamber (an acoustic cooling chamber) 1270. The plurality of combustion nozzles 1230 of each burner 1220 may mix the compressed air with the fuel in an appropriate ratio and inject the mixture to inside of a combustion chamber 1240.

In the cooling chamber 1270, the plurality of combustion nozzles 1230 may be disposed along the circular-shaped virtual line to be spaced apart from each other. The cooling chamber 1270 may fix positions of the plurality of combustion nozzles 1230 to be spaced apart from each other. In addition, the cooling chamber 1270 may absorb combustion vibration generated by the combustion and may cool the plurality of combustion nozzles 1230 and the like to prevent the plurality of combustion nozzles 1230 and the like from being damaged due to high-temperature generated by the combustion.

A plurality of holes may be formed in the cooling chamber 1270, and each of the plurality of combustion nozzles 1230 may be disposed in each of the plurality of holes. In the exemplary embodiment, the cooling chamber 1270 may be formed in a shape similar to a lotus root In the gas turbine 1000, gas fuel, liquid fuel, and composite fuel thereof may be used. It is important to set up combustion environment for reducing exhaust gas under legal regulations, such as carbon monoxide, nitrogen oxide and the like. Although it is relatively difficult to control combustion through pre-mixed combustion, the pre-mixed combustion is widely applied to combustion because it is effective for reducing exhaust gas by decreasing combustion temperature and realizing uniform combustion.

Pre-mixed combustion is applied to the gas turbine 1000 according to the exemplary embodiment, the compressed air is mixed with the fuel to be injected from the combustion nozzle 1230 in advance, and then the mixture is introduced into the combustion chamber 1240.

Each of the plurality of liners 1250 is disposed on a downstream side of each of the plurality of burners 1220, and the fuel and the compressed air which are injected from the combustion nozzle 1230 of the burner 1220 may be combusted in the combustion chamber 1240 which is formed within each of the plurality of liners 1250.

Each of the plurality of liners 1250 may be configured with a double structure of an inner liner 1253 and an outer liner 1251. That is, the double structure is configured that the outer liner 1251 surrounds the inner liner 1253. In this case, the inner liner 1253 is a hollow tubular member, and the fuel and the compressed air are combusted in an inner space of the inner liner 1253, that is, in the combustion chamber 1240.

The transition piece 1260 is positioned on the downstream side of the liner 1250, and the transition piece 1260 may supply the high-pressure gas generated within the liner 1250 to the turbine 1300 at high speed. The transition piece 1260 may be configured with a double structure of an inner transition piece 1263 and an outer transition piece 1261. That is, the double structure is configured that the outer transition piece 1261 surrounds the inner transition piece 1263. In this case, the inner transition piece 1263 is also a hollow tubular member in the same manner as the inner liner 1253, but the inner transition piece 1263 may have a configuration that a diameter thereof gradually decreases from the liner 1250 toward the turbine 1300.

In this case, the inner liner 1253 and the inner transition piece 1263 may be connected to each other by a plate spring seal (not shown). Since each end of the inner liner 1253 and the inner transition piece 1263 are fixed to the side of the combustor 1200 and the turbine 1300, respectively, the plate spring seal (not shown) needs to have a structure acceptable for an expansion of a length and a diameter due to thermal expansion so as to support the inner liner 1253 and the inner transition piece 1263.

The combustor 1200 is under the highest temperature environment in the gas turbine 1000, thus an appropriate cooling is required. The compressed air flows along the liner 1250 through which high-temperature combustion gas flows as well as the external surface of the transition piece 1260, the compressed air is supplied to the combustion nozzle 1230, and in this process, the liner 1250 and the transition piece 1260 which are heated by the high-temperature combustion gas is appropriately cooled.

The gas turbine 1000 according to the exemplary embodiment is configured that the outer liner 1251 and the outer transition piece 1261 surround the inner liner 1253 and the inner transition piece 1263. The compressed air may be permeated into an annular space formed between the inner liner 1253 and the outer liner 1251 and an annular space formed between the inner transition piece 1263 and the outer transition piece 1261. Such a compressed air permeated into the annular space may cool the inner liner 1253 and the inner transition piece 1263.

Meanwhile, a plurality of first cooling holes 1265 may be formed in the outer transition piece 1261 surrounding the inner transition piece 1263. The plurality of first cooling holes 1265 are holes penetrating through the outer transition piece 1261, and the air (hereinafter, referred to as jet flow) passed through the plurality of first cooling holes 1265 may be vertically impinged on the outer circumferential surface of the inner transition piece 1263 to cool the inner transition piece 1263.

A plurality of second cooling hole 1255 may be formed in the outer liner 1251 surrounding the inner liner 1253. The plurality of second cooling holes 1255 are holes penetrating through the outer liner 1251. Like the first cooling hole 1265 described above, the jet flow passed through the plurality of second cooling holes 1255 may be vertically impinged on the outer circumferential surface of the inner liner 1253 to cool the inner liner 1253.

Referring to FIGS. 3 to 8, in the gas turbine 1000 according to the exemplary embodiment, the liner 1250 is disposed on a downstream side of the burner 1220. More particularly, an end region EA of the inner liner 1253 may be disposed to surround an end of the cooling chamber 1270 of the burner 1220. That is, the end of the cooling chamber 1270 may be disposed to overlap the end of the inner liner 1253 with each other. Here, the end of the cooling chamber 1270 represents an end adjacent to the combustion chamber 1240.

In this case, a plate spring seal 1271 is interposed between the end of the cooling chamber 1270 and the inner liner 1253. The plate spring seal 1271 may be disposed on the outer circumferential surface of the cooling chamber 1270 in the circumferential direction of the cooling chamber 1270. The plate spring seal 1271 may have a structure in which an expansion of a length and a diameter due to thermal expansion of the cooling chamber 1270 or the inner liner 1253 is acceptable to support the cooling chamber 1270 and the inner liner 1253.

According to the exemplary embodiment, a plurality of through-holes 1258 are may be formed in the end region EA of the inner liner 1253. The plurality of through-holes 1258 may be spaced apart from each other at a predetermined interval to be formed in the circumferential direction of the inner liner 1253. The plurality of through-holes 1258 may be used as a path in which a part of the compressed air supplied through the annular space between the inner liner 1253 and the outer liner 1251 can flow. The part of the compressed air may be flowed into the inner liner 1253 through the plurality of through-holes 1258 to impinge on the end surface of the cooling chamber 1270. Therefore, the compressed air supplied through the plurality of through-holes 1258 may cool the cooling chamber 1270. That is, in the exemplary embodiment, the plurality of through-holes 1258 formed in the end region EA of the inner liner 1253 may be used to cool the cooling chamber 1270.

As described above, in the exemplary embodiment, the outer liner 1251 may be configured to surround the inner liner 1253. Therefore, the annular space may be formed between the inner liner 1253 and the outer liner 1251.

As described above, in order to form the annular space between the inner liner 1253 and the outer liner 1251, the inner liner 1253 and the outer liner 1251 need to be spaced apart from each other at a predetermined interval.

The plurality of protrusions 1257 (lug) may be disposed on the outer circumferential surface of the inner liner 1253. The plurality of protrusions 1257 may have a protruded-shape toward the outer liner 1251. The plurality of protrusions 1257 may be accommodated into a plurality of accommodation portions 1259 (lug receptacle) positioned on an inner circumferential surface of the outer liner 1251, respectively.

The plurality of protrusions 1257 may be disposed spaced apart from each other at a predetermined interval in the circumferential direction of the outer circumferential surface of the inner liner 1253. The plurality of accommodation portions 1259 may be disposed spaced apart from each other in the circumferential direction of the inner circumferential surface of the outer liner 1251 so as to respectively correspond to the plurality of protrusions 1257.

The plurality of protrusions 1257 according to the exemplary embodiment may comprise a support block 1257*a* and an insertion block 1257*b*.

The support block 1257*a* is a member connected to the outer circumferential surface of the inner liner 1253, and the insertion block 1257*b* is a member connected to an upper surface of the support block 1257*a*. The support block 1257*a* and the insertion block 1257*b* may be accommodated into the accommodation portion 1259. In this case, the support block 1257*a* and the insertion block 1257*b* may have a six-sided shape. Only a portion of a lower surface of the insertion block 1257*b* may be connected to the upper surface of the support block 1257*a*. That is, as only a portion of the lower surface of the insertion block 1257*b* is connected to the upper surface of the support block 1257*a* when viewed from above, the insertion block 1257*b* which is positioned on the support block 1257*a* is more protruded toward the accommodation portion 1259 than the support block 1257*a*. Here, "above" or "upper surface" represents a direction from the inner liner 1253 toward the outer liner 1251 side or a region relatively more adjacent to the outer liner 1251 side based on the inner liner 1253. Meanwhile, "below" or "lower surface" represents a direction from the outer liner 1251 toward the inner liner 1253 side or a region relatively more adjacent to the inner liner 1253 based on the outer liner 1251.

According to the exemplary embodiment, the insertion block 1257*b* is spaced apart from the outer circumferential surface of the inner liner 1253 above, and the insertion block 1257*b* may be overlapped with the plurality of through-holes 1258 formed in the inner liner 1253 in a direction vertical to the outer circumferential surface of the inner liner 1253. More specifically, the insertion block 1257*b* that is positioned on the support block 1257*a* may be protruded toward the accommodation portion 1259 to position the insertion block 1257*b* on the plurality of through-holes 1258. A virtual line connecting the plurality of through-holes 1258 that is formed in the circumferential direction of the inner liner 1253 may be positioned on a lower portion of the insertion block 1257*b*. The virtual line connecting the plurality of through-holes 1258 passes on the lower portion of the insertion block 1257*b*. That is, the plurality of protrusions 1257 are disposed on the outer circumferential surface of the inner liner 1253 to avoid interference in the plurality of through-holes 1258.

When the plurality of through-holes 1258 are not disposed on the lower portion of the insertion block 1257*b*, since the support block 1257*a* and the insertion block 1257*b* are positioned at a portion of a position at which the plurality of through-holes 1258 to be formed, the plurality of through-holes 1258 are not able to be formed at the position, thus the number of the through-holes 1258 is reduced.

By not disposing of the plurality of protrusions 1257 on the region on which the plurality of through-holes 1258 are formed in the inner liner 1253, it may be possible to prevent a decrease of the number of the plurality of through-holes 1258 formed on the inner liner 1253. That is, it may be possible to suppress a decrease of the cooling efficiency of the cooling chamber 1270 due to a decrease of the number of the plurality of through-holes 1258 by the plurality of protrusions 1257.

In the exemplary embodiment, only the insertion block 1257*b* is positioned on the support block 1257*a*. However, the exemplary embodiment is not limited to this. As shown in FIG. 9, a triangle-shaped reinforcing block 1257*c* may be additionally disposed. As the reinforcing block 1257*c* is in contact with the upper surface of the support block 1257*a* and the side of the insertion block 1257*b*, the insertion block 1257*b* can be firmly fixed on the support block 1257*a*.

Meanwhile, the plurality of accommodation portions 1259 accommodating the insertion block 1257*b* may be connected to the inner circumferential surface of the outer liner 1251. The plurality of accommodation portions 1259 may be configured to surround a portion of the insertion block 1257*b*. In this case, the plurality of accommodation portions 1259 may have U-shaped cross-section. By such a shape of the plurality of accommodation portions 1259, the insertion block 1257*b* positioned inside the plurality of accommodation portions 1259 may be blocked to move in a lengthwise direction of the inner liner 1253 or the outer liner 1251.

According to the exemplary embodiment, the inner liner 1253 and the outer liner 1251 may be spaced apart from each other by the plurality of protrusions 1257 at a predetermined interval. In addition, as the U-shaped accommodation portion 1259 accommodates the protrusion 1257, it may be possible that the protrusion 1257 is blocked to move in the lengthwise direction of the liner 1250. Thus, the inner liner 1253 to which the protrusion 1257 is connected may be blocked to move in the lengthwise direction.

In addition, a fixing portion 1254 that is able to block the movement of the protrusion 1257 may be connected to each of the plurality of protrusions 1257. The protrusion 1257 may not be shifted from the accommodation portion 1259 because the fixing portion 1254 may fix the position of the protrusion 1257. In this case, the fixing portion 1254 may be connected to one surface of the insertion block 1257*b* of the protrusion 1257. More specifically, the fixing portion 1254 may be in contact with one surface of and the opposite surface of the insertion block 1257*b* facing the accommodation portion 1259.

The fixing portion 1254 may have a bent shape, and a part of the fixing portion 1254 may be fixed and connected to one side of the outer liner 1251. In this case, the fixing portion 1254 may be removably connected to the outer liner 1251, therefore fixing portion 1254 may be separated from the outer liner 1251 upon a maintenance. Thus, since the protrusion 1257 may also be separated from the accommodation portion 1259 due to removal of the fixing portion 1254, the inner liner 1253 and the outer liner 1251 may be separated from each other.

Referring to FIG. 2, the high-temperature and high-pressure combustion gas generated in the combustor 1200 is supplied to the turbine 1300 through the liner 1250 and the transition piece 1260. In the turbine 1300, combustion gas impinges and gives reaction force on a plurality of turbine blades 1310 that are radially disposed on a rotation shaft of the turbine 1300 while adiabatically expanding, thus thermal energy of the combustion gas is converted to mechanical energy allowing the rotation shaft to be rotated. A part of the mechanical energy obtained in the turbine 1300 is supplied to the compressor as energy required for compressing air, and the remaining mechanical energy is used as effective energy for generating gas and the like.

Hereinafter, the gas turbine 1000 according to a second exemplary embodiment of the present disclosure will be described.

Figure 10:
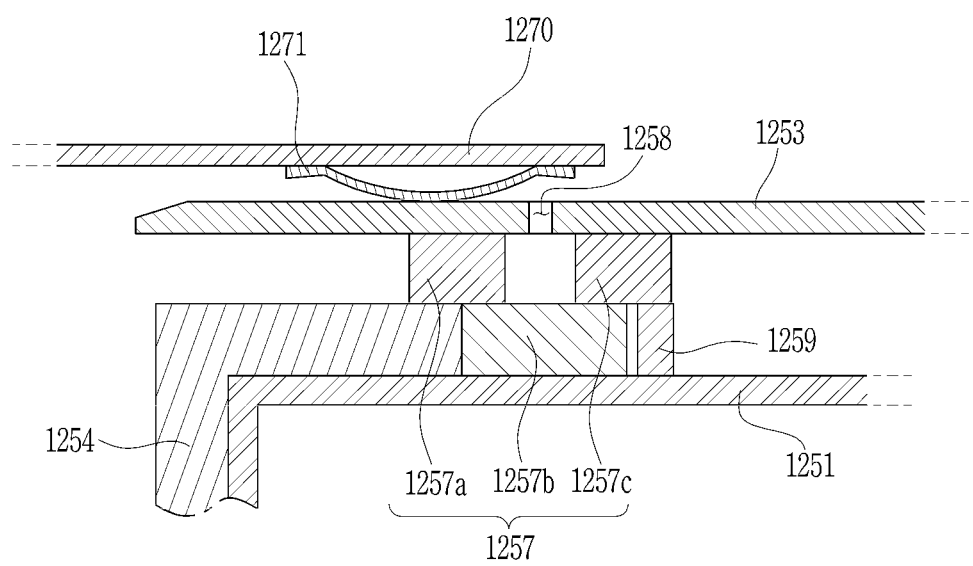
FIG. 10 is a cross-sectional view schematically showing a connection state of a protrusion, an accommodation portion, and a fixing portion of a gas turbine according to a second exemplary embodiment of the present disclosure.
Figure 11:
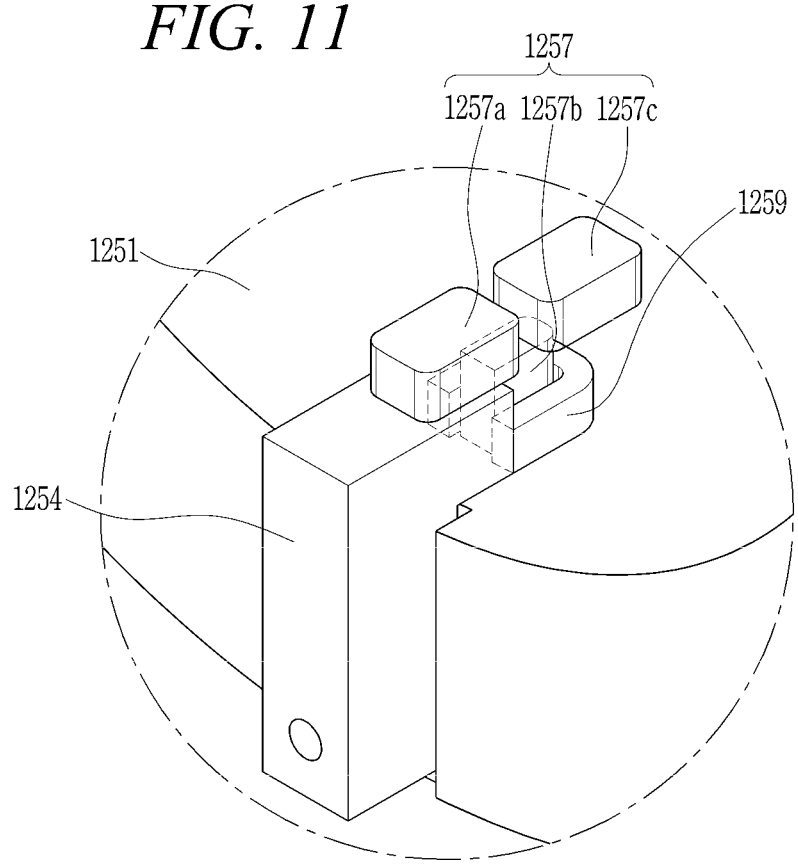
FIG. 11 is a perspective view showing the protrusion in FIG. 10.

FIG. 10 is a cross-sectional view schematically showing a connection state of a protrusion, an accommodation portion, and a fixing portion of the gas turbine 1000 according to the second exemplary embodiment of the present disclosure, and FIG. 11 is a perspective view showing the protrusion in FIG. 10.

Referring to FIGS. 10 and 11, the gas turbine according to the second exemplary embodiment is configured with the same structure as the gas turbine according to the first exemplary embodiment described above except for the configuration of the support blocks 1257a and 1257b of the protrusion 1257, thus the same structure will not be described.

According to the second exemplary embodiment, the support block 1257a and the support block 1257c may be spaced apart from each other to be connected to the outer circumferential surface of the inner liner 1253. In this case, the plurality of through-holes 1258 formed in the inner liner 1253 may be positioned between the support block 1257a and the support block 1257c. In addition, a portion of the lower surface of the insertion block 1257b may be connected to both the support block 1257a and the support block 1257c. That is, in this configuration, the insertion block 1257b is supported by a pair of the support blocks 1257a and 1257c. Thus, a virtual line connecting the plurality of through-holes 1258 formed in the circumferential direction of the inner liner 1253 passes on the lower portion of the insertion block 1257b.

Hereinabove, the exemplary embodiment of the present disclosure has been described, those skilled in the art will appreciate that various modifications and alterations by supplement, modification, elimination, addition and the like of components without departing from the spirit of the present disclosure described, which may be included within the scope of the present disclosure.

As described above, the present disclosure has been described with reference to the specific embodiments and the drawings, but the present disclosure is not limited by these, modifications or alternations may be made by those skilled in the art within the spirit of the disclosure and equivalents in the scope of claims.

What is claimed is:

1. A combustor comprising:
a plurality of combustion nozzles;
a cooling chamber configured to surround the plurality of combustion nozzles;
an inner liner configured to surround one end of the cooling chamber and to have a plurality of through-holes that are formed in a circumferential direction in an end region surrounding the one end of the cooling chamber and, the plurality of through-holes are arranged along a circular virtual line connecting the plurality of through-holes;
an outer liner configured to surround the inner liner and to be spaced apart from the inner liner at a predetermined interval;
a plurality of protrusions spaced apart from each other in the circumferential direction, disposed in the end region between the inner liner and the outer liner, formed on an outer circumferential surface of the inner liner, and configured to maintain the predetermined interval between the inner liner and the outer liner, each of the plurality of protrusions comprising:
a support block connected to the outer circumferential surface of the inner liner and formed as a first six-sided shape, and
an insertion block connected to a radially outwardly facing side of the first six-sided shape and formed as a second six-sided shape, the second six-sided shape including a radially inwardly facing side that overlaps at least a portion of the radially outwardly facing side of the first six-sided shape, the radially inwardly facing side of the second six-sided shape including a portion that is spaced apart from the outer circumferential surface of the inner liner and overlaps the circular virtual line in a direction perpendicular to the outer circumferential surface of the inner liner; and
a plurality of accommodation portions connected to an inner circumferential surface of the outer liner so as to respectively correspond to the plurality of protrusions and configured to receive the respective insertion blocks of the plurality of protrusions,
wherein the second six-sided shape of the insertion block includes a first axially facing side and a second axially facing side opposite to the first axially facing side,
wherein the radially inwardly facing side of the second six-sided shape includes a flat surface that extends from the first axially facing side to the second axially facing side, the flat surface including
a first portion disposed toward the first axially facing side, and
a second portion that is disposed toward the second axially facing side and coincides with the portion of the radially inwardly facing side of the second six-sided shape that is spaced apart from the outer circumferential surface of the inner liner, and
wherein the insertion block is configured to be disposed on the support block with only the first portion of the radially inwardly facing side of the second six-sided shape being in contact with the support block.

2. The combustor of claim 1, wherein the plurality of protrusions are connected to the outer circumferential surface of the inner liner and are configured to be axially inserted into the respective accommodation portions.

3. The combustor of claim 1, wherein each of the plurality of accommodation portions surrounds three sides of the insertion block.

4. The combustor of claim 1, wherein each of the plurality of accommodation portions has a U-shaped cross-section.

5. The combustor of claim 1, wherein the insertion block has a rectangular-shaped cross-section.

6. The combustor of claim 1, wherein each of the plurality of protrusions further comprises a reinforcing block configured to be in contact with an upper surface of the support block and the first axially facing side of the insertion block and to support the insertion block.

7. The combustor of claim 6, wherein the reinforcing block has a triangle-shaped cross-section.

8. The combustor of claim 1, further comprising:
a fixing portion configured to be connected to a side of each of the plurality of protrusions and configured to fix each protrusion into a corresponding accommodation portion of the plurality of accommodation portions.

9. The combustor of claim 8, wherein the fixing portion has a bent shape and includes a first surface configured to abut the side of each of the plurality of protrusions and a second surface configured to be inserted into a recess formed in an upstream end of the outer liner.

10. The combustor of claim 1, further comprising:
a plate spring seal configured to be interposed between the cooling chamber and the inner liner and to be disposed in the circumferential direction.

11. The combustor of claim 1, further comprising:
an inner transition piece configured to be connected to one end of the inner liner, a high-pressure gas combusted in the inner liner flowing through the inner transition piece; and
an outer transition piece configured to surround the inner transition piece and to be spaced apart from the inner transition piece at a predetermined interval.

12. The combustor of claim 11, wherein a plurality of first cooling holes through which a jet flow penetrates are formed in the outer transition piece, the jet flow flowing in a direction crossing the outer circumferential surface of the inner transition piece.

13. The combustor of claim 1, wherein a plurality of second cooling holes through which a jet flow penetrates are formed in the outer liner, the jet flow flowing in a direction crossing the outer circumferential surface of the inner liner.

14. A combustor comprising: a plurality of combustion nozzles;
a cooling chamber configured to surround the plurality of combustion nozzles;
an inner liner configured to surround one end of the cooling chamber and to have a plurality of through-holes that are formed in a circumferential direction in an end region surrounding the one end of the cooling chamber and, the plurality of through-holes are arranged along a circular virtual line connecting the plurality of through-holes;
an outer liner configured to surround the inner liner and to be spaced apart from the inner liner at a predetermined interval;
an inner transition piece configured to be connected to one end of the inner liner, a high-pressure gas combusted in the inner liner flowing through the inner transition piece;
an outer transition piece configured to surround the inner transition piece and to be spaced apart from the inner transition piece at a predetermined interval;
a plurality of protrusions spaced apart from each other in the circumferential direction, disposed in the end region between the inner liner and the outer liner, formed on an outer circumferential surface of the inner liner, and configured to maintain the predetermined interval between the inner liner and the outer liner, each of the plurality of protrusions comprising:
a support block connected to the outer circumferential surface of the inner liner and formed as a first six-sided shape, and
an insertion block connected to a radially outwardly facing side of the first six-sided shape and formed as a second six-sided shape, the second six-sided shape including a radially inwardly facing side that overlaps at least a portion of the radially outwardly facing side of the first six-sided shape, the radially inwardly facing side of the second six-sided shape including a portion that is spaced apart from the outer circumferential surface of the inner liner and overlaps the circular virtual line in a direction perpendicular to the outer circumferential surface of the inner liner;
a plurality of accommodation portions connected to an inner circumferential surface of the outer liner so as to respectively correspond to the plurality of protrusions and configured to receive the respective insertion blocks of the plurality of protrusions; and
a bent fixing portion configured to be connected to a side of each of the plurality of protrusions and to fix each protrusion into a corresponding accommodation portion of the plurality of accommodation portions,
wherein the second six-sided shape of the insertion block includes a first axially facing side and a second axially facing side opposite to the first axially facing side,
wherein the radially inwardly facing side of the second six-sided shape includes a flat surface that extends from the first axially facing side to the second axially facing side, the flat surface including
a first portion disposed toward the first axially facing side, and
a second portion that is disposed toward the second axially facing side and coincides with the portion of the radially inwardly facing side of the second six-sided shape that is spaced apart from the outer circumferential surface of the inner liner, and
wherein the insertion block is configured to be disposed on the support block with only the first portion of the radially inwardly facing side of the second six-sided shape being in contact with the support block.

15. A gas turbine comprising:
a compressor configured to compress air supplied from outside;
a combustor configured to mix the air compressed by the compressor with fuel so as to combust the mixture; and
a turbine comprising a plurality of turbine blades rotated by the combustion gas combusted in the combustor,
wherein the combustor comprises
a plurality of combustion nozzles,
a cooling chamber configured to surround the plurality of combustion nozzles,
an inner liner configured to surround one end of the cooling chamber and to have a plurality of through-holes formed in a circumferential direction in an end region surrounding the one end of the cooling chamber and, the plurality of through-holes are arranged along a circular virtual line connecting the plurality of through-holes,
an outer liner configured to surround the inner liner and to be spaced apart from the inner liner at a predetermined interval,
a plurality of protrusions spaced apart from each other in the circumferential direction, disposed in the end region between the inner liner and the outer liner, formed on an outer circumferential surface of the inner liner, and configured to maintain the predetermined interval between the inner liner and the outer liner, each of the plurality of protrusions comprising:
a support block connected to the outer circumferential surface of the inner liner and formed as a first six-sided shape, and
an insertion block connected to a radially outwardly facing side of the first six-sided shape and formed as a second six-sided shape, the second six-sided shape including a radially inwardly facing side that overlaps at least a portion of the radially outwardly facing side of the first six-sided shape, the radially inwardly facing side of the second six-sided shape including a portion that is spaced apart from the outer circumferential surface of the inner liner and overlaps the circular virtual line in a direction perpendicular to the outer circumferential surface of the inner liner, and a plurality of accommodation portions connected to an inner circumferential surface of the outer liner so as to respectively correspond to the plurality of protrusions and configured to receive the respective insertion blocks of the plurality of protrusions, wherein the second six-sided shape of the insertion block includes a first axially facing side and a second axially facing side opposite to the first axially facing side, wherein the radially inwardly facing side of the second six-sided shape includes a flat surface that extends from the first axially facing side to the second axially facing side, the flat surface including a first portion disposed toward the first axially facing side, and a second portion that is disposed toward the second axially facing side and coincides with the portion of the radially inwardly facing side of the second six-sided shape that is spaced apart from the outer circumferential surface of the inner liner, and wherein the insertion block is configured to be disposed on the support block with only the first portion of the radially inwardly facing side of the second six-sided shape being in contact with the support block.

16. The gas turbine of claim 15, wherein the plurality of protrusions are connected to the outer circumferential surface of the inner liner and are configured to be axially inserted into the respective accommodation portions.

17. The gas turbine of claim 15, wherein each of the plurality of accommodation portions surrounds three sides of the insertion block.

18. The gas turbine of claim 15, wherein each of the plurality of accommodation portions has a U-shaped cross-section.

19. The gas turbine of claim 15, wherein each of the plurality of protrusions further comprises a reinforcing block configured to be in contact with an upper surface of the support block and the first axially facing side of the insertion block and to support the insertion block.

20. The gas turbine of claim 15, further comprising:
a fixing portion having a bent shape configured to be connected to a side of each of the plurality of protrusions and configured to fix each protrusion into a corresponding accommodation portion of the plurality of accommodation portions.

* * * * *